E. Behr.
Skate Fastening.
No. 4,088
Reissued Aug. 2, 1870.
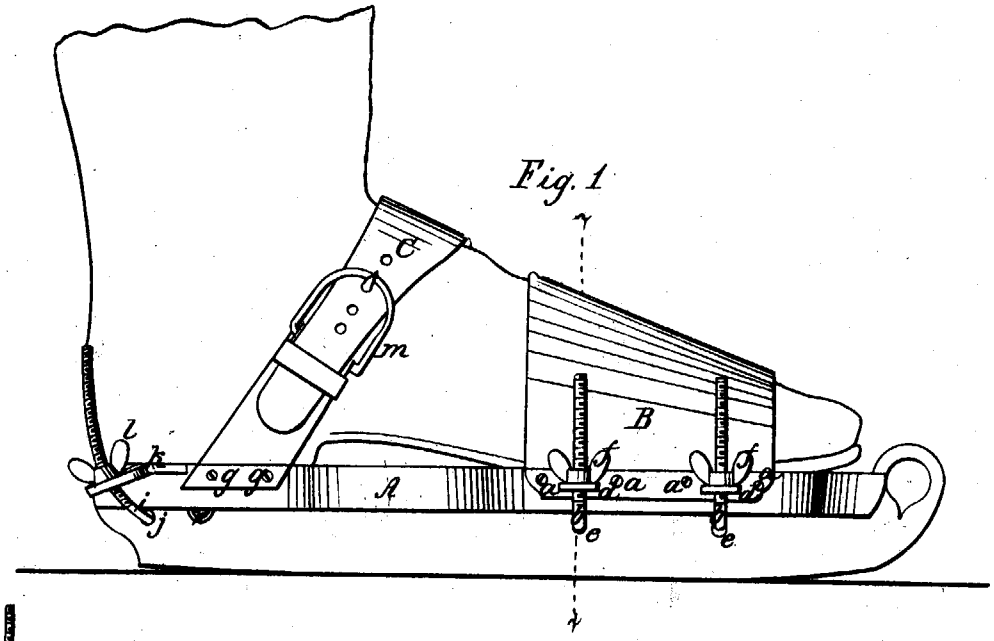
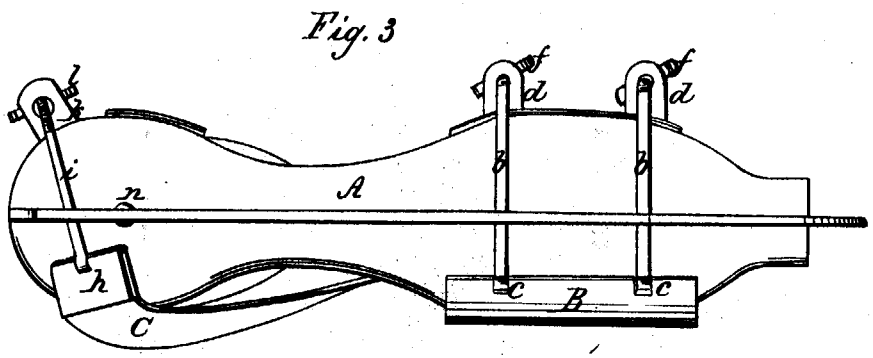
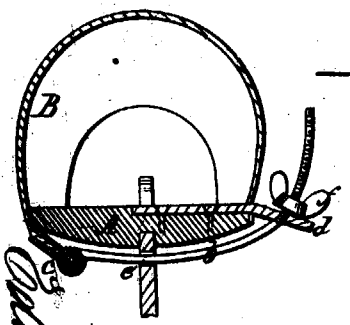
Witnesses
John W. Jackson Jr.
W. Tosch
Inventor
Edward Behr
H. PETERS, PHOTO-LITHOGRAPHER, WASHINGTON, D. C.

United States Patent Office.

NATHANIEL LADD, OF BROOKLYN NEW YORK, ASSIGNEE, BY MESNE ASSIGNMENTS, OF THE ADMINISTRATORS OF THE ESTATE OF EDWARD BEHR, DECEASED.

*Letters Patent No.* 23,344, *dated March* 29, 1859; *reissue No.* 4,088, *dated August* 2, 1870.

MODE OF FASTENING SKATES.

The Schedule referred to in these Letters Patent and making part of the same

*To all whom it may concern:*

Be it known that EDWARD BEHR, of the city, county, and State of New York, did invent a new and improved Mode of Fastening Skates to the Feet, and being advised by counsel learned in the law that said Letters Patent are partially inoperative by reason of a defective specification, and should be surrendered and reissued on an amended specification, I, NATHANIEL LADD, of the city of Brooklyn, in the county of Kings and State of New York, assignee of all the right, title, and interest of said EDWARD BEHR, deceased, do hereby declare that the following is such an amended specification, and is a full and exact description of the said invention, reference being had to the accompanying drawing making part of this specification, in which—

Figure 1 represents a side elevation of a skate constructed and fastened according to this improvement;

Figure 2 is a transverse vertical section of same, the line *x x*, fig. 1, indicating the plane of section; and Figure 3 is an inverted plan of same.

Similar letters of reference indicate corresponding parts in the several figures.

The previously common mode of fastening skates by straps, secured with buckles by means of a series of holes, is very objectionable, not only because the straps themselves, if properly tightened, cause pain to the foot, but also because it is impossible, in most cases, to properly tighten the strap, on account of the distance of the holes in the same, and these holes when put too close together weaken the strap, and if the strap is sufficiently tight, the holes sometimes tear out, and the pleasure is spoiled.

To overcome these difficulties is the object of this invention; and

It consists in fastening the skates by means of screws, exerting a force transversely across the skate beneath the foot-piece or foot-plate, with suitable connections to convey the force to the boot, and thus, ultimately, to the foot within the boot, and hold the skate firmly to the foot with a strong and nicely-adjustable force.

The invention is preferably carried out by attaching such screws to a toe-cap and to a heel-strap, in such a manner that the strain of the cap and of the strap can be adjusted by turning the screws, and that the foot can be cramped in the toe-cap, and, by means of the heel-strap, without causing any pain, and still confining the same perfectly to the skate.

To enable others skilled in the art to fully understand, use, and construct the invention, I will proceed to describe it.

A represents the wood or body of a skate, constructed in the usual manner; and

B is a toe-cap, which is rigidly attached to one side of the stock of the skate, by means of screws or tacks *a*, and to the other side of the toe-cap two screws, *b*, are fastened by means of a hinge, *c*, which is rigidly attached to the end of the cap, as clearly represented in fig. 2.

The screws *b* are bent, so as to conform to the under side of the stock of the skate, and two ears, *d*, are rigidly attached to that side of the stock to which the toe-cap is fastened.

The screws pass through openings, *e*, in the skate-iron, and through holes in the ears *d*, and nuts *f* serve to draw up or release the screws.

In the same manner the heel-strap C is attached to one side of the stock, by means of screws or tacks *g*, and a hinge, *h*, is fastened to its lower end, from which a screw, *i*, extends through an opening, *j*, in the skate-iron, and through an ear, *k*, on the other side of the stock.

This ear is rigidly attached to the back end of the stock, and in such a position that, by turning the nut *l*, which fits on the screw *i*, the heel-strap is drawn up tight or relaxed, according to the direction in which the nut is turned.

This strap consists of two parts, which are united by a buckle, *m*, so as to be able to adjust the same to different sized feet without too much screwing.

The operation is as follows:

The foot is placed on the stock, the toes being passed through the toe-cap, as clearly represented in fig. 1, and the heel-strap C is drawn up as tight as it can conveniently be done by means of the buckle *m*, and now the nuts *f* and *l* are turned on.

The toe-cap is drawn up perfectly tight to the foot by means of the screws *b*, and the turning of the nuts requires no extra exertion, so that ladies, even, will be able to fasten their skates without assistance, and, at the same time, the toe-cap being made of a pretty wide piece of leather, so that it covers a larger part of the foot than common straps, the pressure of the same on the foot causes no pain.

And in the same manner, the back part of the foot is secured to the stock by turning the nut *l*, the heel being kept in its place by a spike, *n*, which projects from the upper side of the stock in the usual manner.

One great advantage of these screws is, that when the skate becomes a little loose on the foot, it requires but one or two additional turns of the nuts in order to fasten the same again perfectly tight, and the nuts can be operated without being obliged to sit down, and with the greatest ease.

Having now fully described the invention, together with efficient means for putting it in practice,

What I claim as new, and as the invention of the said BEHR, is as follows:

A skate having one or more screws, *b*, with suitable connections, *f d* B, arranged as shown, so as to develope the force of the screw or screws in a direction transverse to the skate, in the manner herein specified.

NATHANIEL LADD.

Witnesses:
C. C. LIVINGS,
W. C. DEY.